US011252469B2

(12) United States Patent
Smith et al.

(10) Patent No.: US 11,252,469 B2
(45) Date of Patent: *Feb. 15, 2022

(54) METHODS AND APPARATUS TO MONITOR STREAMING MEDIA CONTENT

(71) Applicant: The Nielsen Company (US), LLC, New York, NY (US)

(72) Inventors: Kale Smith, New York, NY (US); Ben Ropke, New Rochelle, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,458

(22) Filed: Oct. 12, 2020

(65) Prior Publication Data

US 2021/0168445 A1 Jun. 3, 2021

Related U.S. Application Data

(63) Continuation of application No. 16/224,533, filed on Dec. 18, 2018, now Pat. No. 10,805,677.

(51) Int. Cl.
*H04N 21/442* (2011.01)
*H04L 12/26* (2006.01)
(Continued)

(52) U.S. Cl.
CPC ... *H04N 21/44204* (2013.01); *G06Q 30/0201* (2013.01); *G10L 19/018* (2013.01);
(Continued)

(58) Field of Classification Search
CPC ....... H04N 21/44204; H04N 21/44213; H04N 21/4755; H04N 21/41407; H04N 21/5416;
(Continued)

(56) References Cited

U.S. PATENT DOCUMENTS 6,654,480 B2   11/2003   Rhoads
6,725,193 B1   4/2004   Makovicka
(Continued)

FOREIGN PATENT DOCUMENTS

KR   10-2011-0068664   6/2011
WO   2018020080        2/2018

OTHER PUBLICATIONS

International Bureau, "International Preliminary Report on Patentability," mailed in connection with International Patent Application No. PCT/US2019/066609, dated Jun. 16, 2021, 5 pages.

(Continued)

*Primary Examiner* — Kyung H Shin
(74) *Attorney, Agent, or Firm* — Hanley, Flight & Zimmerman, LLC

(57) ABSTRACT

Methods, apparatus, systems and articles of manufacture are disclosed to monitor streaming media content. An example apparatus to monitor streaming media content includes a flag detector to determine if a streaming media flag is asserted in a content of a watermark associated with a media exposure event, the media exposure event included in panel data from a panel meter, the panel meter to monitor a media presentation device via an audio output channel of the media presentation device. A data selector to, when the streaming media flag is asserted: discard the media exposure event associated with the streaming media flag from the panel data and select the media exposure event from network traffic reports to credit media presented by the media presentation device, the network traffic reports obtained from a meter that monitors network traffic to and from the media presentation device.

20 Claims, 6 Drawing Sheets

(51) Int. Cl.
*H04N 21/8358* (2011.01)
*H04L 29/06* (2006.01)
*G06Q 30/02* (2012.01)
*G10L 19/018* (2013.01)
*H04L 29/08* (2006.01)
*H04N 21/466* (2011.01)

(52) U.S. Cl.
CPC ............ *H04L 43/062* (2013.01); *H04L 63/10* (2013.01); *H04L 65/4076* (2013.01); *H04L 67/22* (2013.01); *H04N 21/44213* (2013.01); *H04N 21/8358* (2013.01); *H04L 2463/101* (2013.01); *H04N 21/4667* (2013.01)

(58) Field of Classification Search
CPC ............ H04N 21/6125; G06Q 30/0201; G10L 19/018; H04H 60/45; H04L 67/22
See application file for complete search history.

(56) References Cited

U.S. PATENT DOCUMENTS

| | | | |
|---|---|---|---|
| 7,827,312 | B2 | 11/2010 | Ramaswamy et al. |
| 8,451,086 | B2 | 5/2013 | Petrovic et al. |
| 9,189,955 | B2 | 11/2015 | Petrovic et al. |
| 9,210,208 | B2 | 12/2015 | Ramaswamy et al. |
| 9,219,559 | B2 | 12/2015 | McMillan |
| 9,548,053 | B1 | 1/2017 | Basye et al. |
| 9,691,378 | B1 | 6/2017 | Meyers et al. |
| 9,711,153 | B2 | 7/2017 | McKenna et al. |
| 10,147,433 | B1 * | 12/2018 | Bradley ................ G10L 19/018 |
| 10,805,677 | B2 | 10/2020 | Smith et al. |
| 2011/0288974 | A1 | 11/2011 | Pearson et al. |
| 2012/0130719 | A1 | 5/2012 | Petrovic et al. |
| 2012/0151079 | A1 | 6/2012 | Besehanic et al. |
| 2012/0297409 | A1 | 11/2012 | Zaslavsky et al. |
| 2013/0205311 | A1 | 8/2013 | Ramaswamy et al. |
| 2014/0282669 | A1 * | 9/2014 | McMillan ........ H04N 21/44204 725/19 |
| 2014/0325057 | A1 * | 10/2014 | Borawski ............... H04H 60/45 709/224 |
| 2015/0262201 | A1 * | 9/2015 | Rao .................... G06Q 30/0201 705/7.29 |
| 2016/0379235 | A1 | 12/2016 | Mendrisova et al. |
| 2017/0287495 | A1 | 10/2017 | Tada et al. |

OTHER PUBLICATIONS

Stone, "Why Your Echo Won't Perk Up During Amazon's Super Bowl Ad," Fortune, Feb. 3, 2018, 2 pages. Retrieved from http://fortune.com/2018/02/03/alexa-super-bowl-ad/.

International Searching Authority, "International Search Report," mailed in connection with International Patent Application No. PCT/US2019/066609, dated Apr. 17, 2020, 3 pages.

International Searching Authority, "Written Opinion," mailed in connection with International Patent Application No. PCT/US2019/066609, dated Apr. 17, 2020, 4 pages.

United States Patent and Trademark Office, "Notice of Allowance," mailed in connection with U.S. Appl. No. 16/224,533, dated Jun. 11, 2020, 5 pages.

United States Patent and Trademark Office, "Non-final Office Action," mailed in connection with U.S. Appl. No. 16/224,533, dated Feb. 19, 2020, 14 pages.

* cited by examiner

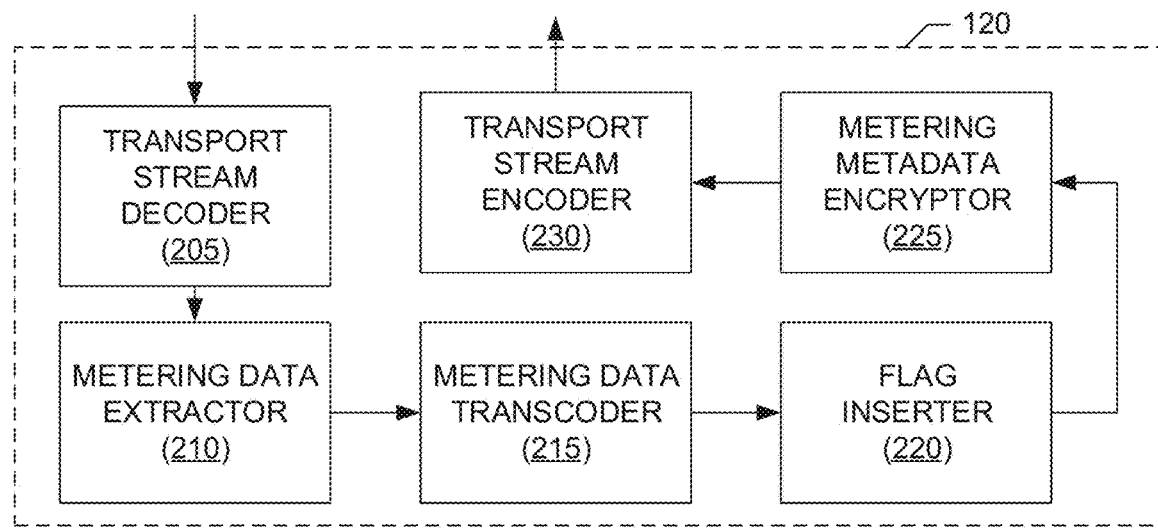
FIG. 2
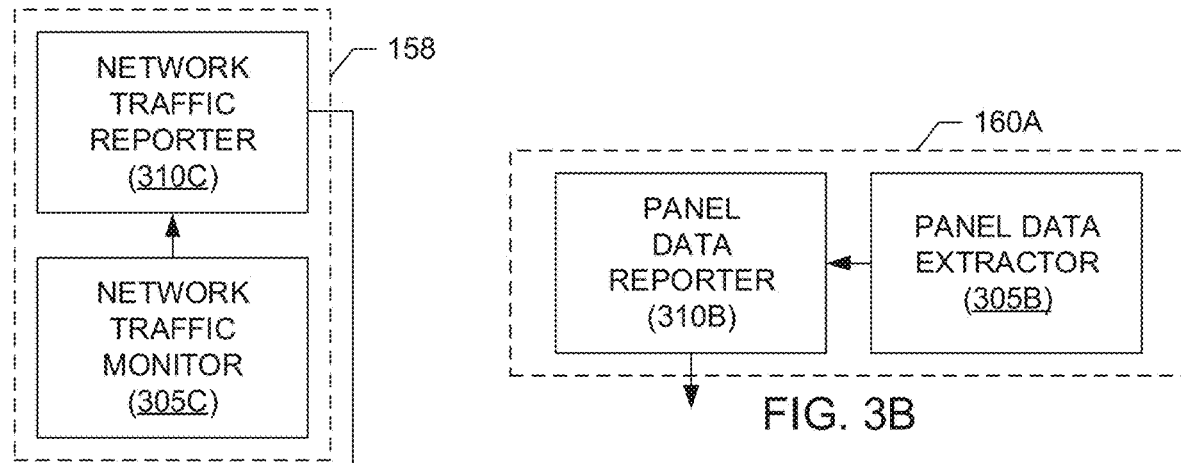
FIG. 3C
FIG. 3B
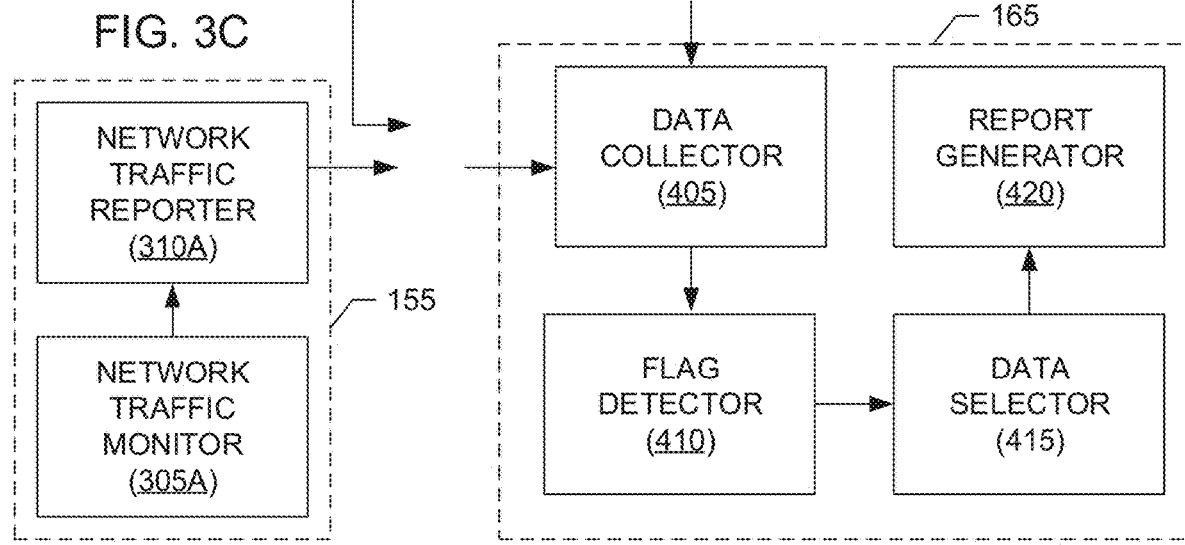
FIG. 3A
FIG. 4

METHODS AND APPARATUS TO MONITOR STREAMING MEDIA CONTENT

RELATED APPLICATION(S)

This patent arises from a continuation of U.S. patent application Ser. No. 16/224,533, which is titled "METHODS AND APPARATUS TO MONITOR STREAMING MEDIA CONTENT," and which was filed on Dec. 18, 2018. Priority to U.S. patent application Ser. No. 16/224,533 is claimed. U.S. patent application Ser. No. 16/224,533 is hereby incorporated herein by reference in its entirety.

FIELD OF THE DISCLOSURE

This disclosure relates generally to streaming media, and, more particularly, to methods and apparatus to monitor streaming media content.

BACKGROUND

In recent years, media content can be delivered to and presented by a wide variety of media presentation devices, such as desktop computers, laptop computers, tablet computers, personal digital assistants, smartphones, etc. Because a significant portion of media content is presented via streaming to such devices, monitoring of streaming media content, like the monitoring of broadcasted media content, can provide valuable information to advertisers, content providers, and the like.

BRIEF DESCRIPTION OF THE DRAWINGS

FIG. 2 is a block diagram of an example implementation of the transcoder of the system of FIG. 1.

FIG. 3A is a block diagram of an example implementation of the streaming meter of the system of FIG. 1.

FIG. 3B is a block diagram of an example implementation of the panel meter of the system of FIG. 1.

FIG. 3C is a block diagram of an example implementation of the on device meter of the system of FIG. 1.

FIG. 4 is a block diagram of an example implementation of the media monitoring facility of the system of FIG. 1.

DETAILED DESCRIPTION

Figure 1:
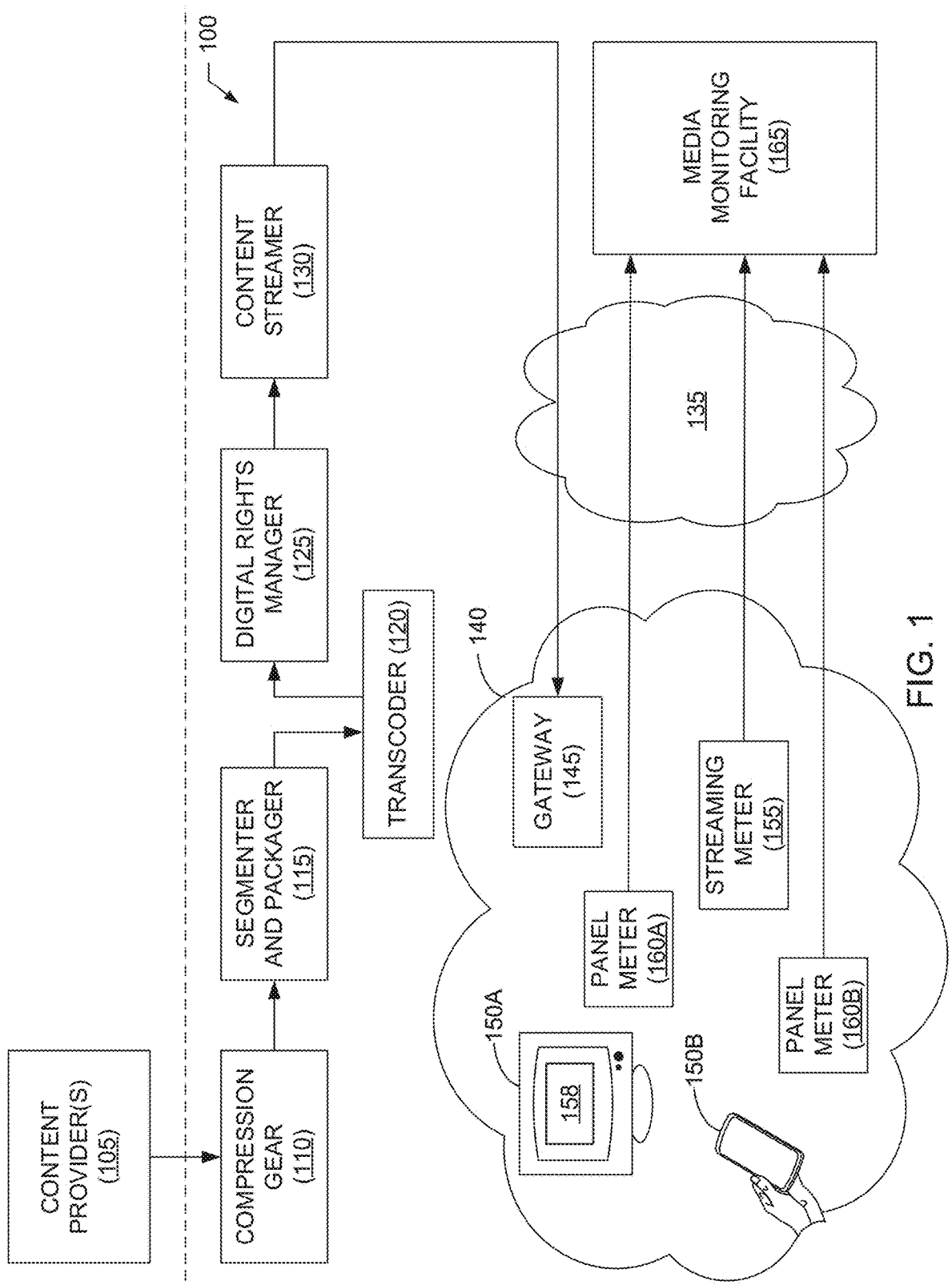
FIG. 1 is a block diagram of an example system 100 for monitoring streaming media content.

Households may contain media presentation devices that can present media from traditional distribution channels (e.g. a broadcast distribution channel) and can also present media from the Internet (e.g. streaming media).

Many audience measurement entities (AME) monitor households using one or more panel meters (also known as people meters). The panel meters monitor the audio output of the media presentation devices. Because the panel meter uses the audio output to monitor media presentations, the panel meter can detect media from traditional distribution channels that is presented on a media presentation device and can detect streaming media presented on a media presentation device. Unfortunately, the panel meter is currently unable to determine if the media is from a traditional distribution channel or is streaming media.

Streaming media is defined to include media data (such as audio and/or video data) transmitted from a media source over a data network to a media device for presentation such that a portion of the media data is presented (possibly after buffering at the media device) while a subsequent portion of the media data is being received (and possibly buffered at the media device). In some examples, the media source corresponds to Amazon Music, Amazon Video, CBS All Access, Disney+, Google Play Music, Hulu, You Tube, etc. (the media source may also be known as a content provider), the media device corresponds to, for example, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc, and the data network corresponds to the Internet and/or a private network. In some examples, the media data is transmitted from the media source to the media device using one or more data transport streams established according to one or more existing and/or future network streaming communication protocols, such as Dynamic Adaptive Streaming over HTTP (DASH), HTTP live streaming (HLS), Real-time Transport Protocol (RTP), etc.

Some households include a streaming meter in addition to the panel meters. The streaming meter monitors the network traffic to and from media presentation devices to detect the presentation of streaming media by the media presentation devices. When both the panel meter and the streaming meter are monitoring the same media presentation device while the media presentation device is presenting streaming media, both the streaming meter and the panel meter may report the media exposure event to the audience measurement entity. The panel meter and the streaming meter are unaware that the other device is reporting the media presentation. Because both the panel meter and the streaming meter report the same media exposure event, the audience measurement entity may double count the media exposure event from the streaming media, which causes inaccuracies in crediting media exposure events from streaming media. As such, monitoring of streaming media content in accordance with examples described herein increases the accuracy of the monitored streaming media.

Methods, apparatus and articles of manufacture to monitor streaming media content are disclosed herein that prevent the double counting of media exposure events. In some examples, a streaming media flag is asserted in a watermark associated with the media and embedded/encoded in the audio data of the streaming media. In some examples, as the panel meter monitors the audio data from the streaming media, the asserted streaming media flag is detected from the payload of the embedded/encoded watermark. When the panel meter detects the asserted streaming media flag, the panel meter may discard the media exposure event that is associated with the streaming media flag. In other examples, the panel meter sends the media exposure event and the content of the watermark, with the asserted streaming media flag, to the audience measurement entity. The audience measurement entity will discard (e.g., not use) the media presentation associated with the asserted streaming media flag when it also receives the media exposure event from the streaming meter.

An example apparatus disclosed herein to monitor streaming media content includes a flag detector to determine if a streaming media flag is asserted in the content of a watermark associated with a media exposure event, the media exposure event being included in panel data from a panel meter, the panel meter to monitor a media presentation device via an audio output channel of the media presentation device.

A media exposure event is the data collected when media is presented on a media presentation device. Media exposure events include, but are not limited to, metering data (e.g., media-identifying metadata, codes, signatures, watermarks, and/or other information that may be used to identify presented media), and/or application usage information (e.g., an identifier of an application, a time and/or duration of use of the application, a rating of the application, etc.), and/or user-identifying information (e.g., demographic information, a user identifier, a panelist identifier, a username, etc.), and/or presentation information (e.g., the time/date the content was presented, the location the content was presented, the device type the content was presented on, etc.).

The example apparatus also includes a data selector to, when the streaming media flag is asserted, discard/not use media exposure events associated with the streaming media flag from the panel data and select/use media exposure events from network traffic reports to credit media presented by the media presentation device, the network traffic reports obtained from a meter that monitors network traffic to and from the media presentation device. In further examples, a report generator creates media exposure reports using the selected media exposure events from the network traffic reports. The report generator may also use census data (e.g., user-identifying information) included in the panel data to verify census reporting.

In some examples, the flag detector additionally includes locating the first streaming media flag in an unused final distribution code slot of the media exposure watermark associated with a media exposure event. In further examples, the media exposure watermarks in the audio data that is output from the audio output channel are in a first watermarking layer, and the asserted streaming media flag is located in a watermark in a second, different, watermarking layer.

In some examples, the apparatus additionally includes a second streaming media flag that is located in the network traffic reports. In further examples, the second streaming media flag is included in an ID3 tag in the network traffic reports. In some examples, the media presentation device is an over the top (OTT) device.

Turning to the figures, a block diagram of an example system 100 for monitoring streaming media content is illustrated in FIG. 1. The example system 100 includes example content provider(s) 105, an example compression gear 110, an example segmenter and packager 115, an example transcoder 120, an example digital rights manager 125, an example content streamer 130, an example network 135, an example location 140, an example gateway 145, two example media presentation devices 150A and 150B, an example streaming meter 155, an example on device meter 158, two example panel meters 160A and 160B, and an example media monitoring facility 165.

The example content provider(s) 105 provide the streaming media content to the example compression gear 110. The content provider(s) 105 of the illustrated example correspond to any one or more content providers capable of providing media content for streaming to the example compression gear 110. The media content provided by the content provider(s) 105 can be any type of media content, such as audio content, video content, multimedia content, etc. Additionally, the media content can correspond to live (e.g., broadcast) media content, stored media content (e.g., on-demand content), etc. In some examples, the media provided by the content provider(s) 105 may include watermarks embedded in the video or audio content of the media. The watermark content or payload may identify the media content, identify a source of the media content, and/or otherwise describes and/or is associated with the media content.

The compression gear 110 employs any appropriate technique(s) to compress and/or otherwise process the received media content into a form suitable for streaming. For example, the compression gear 110 may compress the media content in accordance with MPEG 4 audio/video compression. The segmenter and packager 115 employs any appropriate technique(s) to segment and package the compressed media content into a form suitable for streaming. For example, the segmenter and packager 115 can segment and package the compressed media content into one or more MPEG 2 transport streams for streaming using HTTP live streaming (HLS) or any other past, present and/or future, streaming protocol.

In the illustrated example, the example transcoder 120 receives the transport streams from the example segmenter and packager 115 and extracts, from the media content, metering data that is encoded in a first format. For example, the metering data may be in the payload of watermarks that are already embedded/encoded in the media content. For example, the transcoder 120 can obtain and extract embedded/encoded audio/video watermarks that were inserted into the media content by the content provider(s) 105. The embedded/encoded audio/video watermarks correspond to the metering data. The metering data identifies the media content, identifies a source of the media content, and/or otherwise describes and/or is associated with the media content.

The transcoder 120 asserts a streaming media flag in the metering data that is in the first format. The streaming media flag indicates that the media is being distributed as streaming media. The streaming media flag may be asserted in any manner, for example setting a bit to a one or zero in the metering data.

In some examples, the streaming media flag is in an unused final distribution code slot of a media exposure watermark already included in the metering data that is in the first format. In other examples, the streaming media flag is in a second watermark in a second, different, watermarking layer than the media exposure watermark already included in the metering data. For example, the media exposure watermark already included in the metering data may be in a first watermarking layer using a first set of frequency bands and the second watermark with the streaming media flag may be in a second watermarking layer using a second set of frequency bands. The transcoder embeds/encodes the watermark with the asserted streaming media flag back into the audio data of the media content.

The transcoder 120 transcodes the metering data in the first format into text data, binary data, etc., that corresponds to metering data in a second format. In some examples, the transcoder 120 may insert a streaming media flag into the text data, binary data, etc., that corresponds to the metering data in the second format, such that a streaming meter can identify the streaming media flag. The transcoder 120 then encodes the transcoded metering data (which is in the second format that is decodable by streaming meters) into a metadata channel associated with the transport stream(s) that is(are) to carry the streaming media content.

In some examples, the transcoder 120 is implemented as a plug-in based on a software development kit (SDK) provided by the entity that embedded the audio/video watermarks in the media content. In such examples, the transcoder 120 can employ functionality provided by the SDK to extract and decode audio/video watermark(s) embedded in the media content to obtain the payload data carried by the watermark(s) and insert and encode audio/video watermark(s) that include the asserted streaming media flag into the media content. In some examples, in accordance with one or more versions of the ID3 tagging standards, the transcoder 120 inserts the payload data obtained from the watermark(s) as ID3 tag metadata and/or other metadata in the transport stream(s) that is (are) to stream the media content in accordance with the HLS or other appropriate streaming protocol. Another example implementation of the transcoder 120 is illustrated in FIG. 2, which is described in greater detail below.

In some examples, the transcoder 120 is implemented as a plug-in or other application/device associated with or executed by one or more of the compression gear 110, the segmenter and packager 115, the digital rights manager 125 and/or the content streamer 130. In some examples, the transcoder 120 is implemented by an apparatus separate from the compression gear 110, the segmenter and packager 115, the digital rights manager 125 and the content streamer 130

The digital rights manager 125 encrypts and/or otherwise protects, in accordance with any appropriate digital rights management technique and/or protocol, the media content to be streamed. The content streamer 130 employs any appropriate technique(s) to select and stream the media content to a requesting device. For example, the content streamer 130 can select media content that has been MPEG 4 compressed, segmented and packaged into one or more MPEG 2 transport streams, and encrypted for digital rights management, and then stream the content, across network 135, to location 140 using HLS or any other streaming protocol.

In some examples, the compression gear 110, the segmenter and packager 115 and/or the digital rights manager 125 prepare content for streaming regardless of whether (e.g., prior to) a request is received. In such an example, the content streamer 130 prepares a transport stream for streaming the already-prepared content when a request is received from location 140. In other examples, the compression gear 110, the segmenter and packager 115 and/or the digital rights manager 125 prepare the content for streaming in response to a request received from location 140.

Location 140 may be a home, an office, a restaurant, or any place media can be presented. Location 140 includes a gateway 145 that receives the streaming media from content streamer 130. In some examples, gateway 145 distributes the streaming media to one or more of the two media presentation devices 150A and 150B using a wireless network connection. In other examples, gateway 145 may us a wired connection (e.g. a LAN connection) to distribute streaming media to one or more of the two media presentation devices 150A and 150B.

The media presentation devices 150A and 150B of the illustrated example are computing devices that are capable of presenting streaming media content provided by the content streamer 130 via the network 135. The media presentation devices 150A and 150B may be, for example, a desktop computer, a laptop computer, a mobile computing device, a television, a Roku, an Apple® TV, an Amazon Fire TV, a Chromecast, a smart phone, a mobile phone, an Apple® iPad®, an Apple® iPhone®, an Apple® iPod®, an Android™ powered computing device, a Palm® webOS® computing device, etc. In some examples, the media presentation devices 150A and 150B may be over the top (OTT) devices. In some examples, the media presentation devices 150A and 150B include one or more executable media players to present the streaming media content provided by the content streamer 130. For examples, the media player(s) available to the media presentation devices 150A and 150B may be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. While two media presentation devices 150A and 150B are illustrated, any number and/or type(s) of media presentation devices may be included in the system 100.

Location 140 includes an example streaming meter 155 that monitors the network communications of the two example media presentation devices 150A and 150B. In some examples, streaming meter 155 monitors a home wireless networks (e.g., WiFi networks, etc.) to generate media exposure events of streamed media presented at the two example media presentation devices 150A and 150B. In other examples, the streaming meter 155 may monitor a local area network (LAN) that couples the gateway 145 to the media presentation devices 150A and 150B to generate media exposure events of streamed media presented at the two example media presentation devices 150A and 150B.

The streaming meter 155 of the illustrated example decodes metering data included in a metadata channel (or channels) associated with (e.g., provided prior to or accompanying and flowing with) the transport channel(s) providing the streaming media content to the media presentation devices 150A and 150B. For example, a metadata channel decoded by the streaming meter 155 can correspond to an external metadata channel external to the transport stream carrying the media content, or an internal metadata channel comprising one or more data fields of the transport stream carrying the media content. An example external metadata channel includes an M3U file or other text file associated with a transport stream carrying the streaming media content and containing metering data transcoded by the transcoder 120 into a text or other appropriate data format. In some examples, such as an example employing the HLS protocol, the streaming meter 155 extracts and decodes ID3 tag(s) that contain the metering data. The streaming meter 155 of the illustrated example stores the decoded metering data (as well as any other metering information captured by the streaming meter, timestamps added by the streaming meter 155 to the decoded metering data and/or the other metering information, etc.) for reporting to the media monitoring facility 165. In the illustrated example, the streaming meter 155 reports its stored metering data (as well as any other metering information, timestamps, etc.) using an HTTP request sent to an HTTP interface of the media monitoring facility 165. An example implementation of the streaming meter 155 is illustrated in FIG. 3A, which is described in greater detail below.

In some examples, the media presentation devices 150A and/or 150B may include an on device meter, for example on device meter 158. The on device meter may also be used to detect the presentation of streaming media on a media presentation device. However, unlike the streaming meter 155, the on device meter 158 only monitors the media presentation device on which it is installed. The on device meter 158 is software/firmware that executes on a media presentation device, for example media presentation device 150A. The on device meter 158 tracks the network communications of media presentation device 150A. The on device meter 158 of the illustrated example decodes metering data included in a metadata channel (or channels) associated with (e.g., provided prior to or accompanying and flowing with) the transport channel(s) providing the streaming media content to the media presentation device 150A. For example, a metadata channel decoded by the on device meter 158 can correspond to an external metadata channel external to the transport stream carrying the media content, or an internal metadata channel comprising one or more data fields of the transport stream carrying the media content. An example external metadata channel includes an M3U file or other text file associated with a transport stream carrying the streaming media content and containing metering data transcoded by the transcoder 120 into a text or other appropriate data format. In some examples, such as an example employing the HLS protocol, the on device meter 158 extracts and decodes ID3 tag(s) that contain the metering data. The on device meter 158 of the illustrated example stores the decoded metering data (as well as any other metering information captured by the on device meter, timestamps added by the on device meter 158 to the decoded metering data and/or the other metering information, etc.) for reporting to the media monitoring facility 165. In the illustrated example, the on device meter 158 reports its stored metering data (as well as any other metering information, timestamps, etc.) using an HTTP request sent to an HTTP interface of the media monitoring facility 165.

The example system 100 includes panel meters 160A and 160B at location 140 that monitor the audio output channels of respective example media presentation devices 150A and 150B to collect panel data. The panel meters 160A and 160B may monitor the audio output channel using a direct connection, or indirectly using a microphone. Panel meters 160A and 160B decode the panel data and detect watermarks embedded/encoded in the audio output of the presentation devices 150A and 150B. The watermarks may include an asserted streaming media flag when the media presentation devices 150A and 150B are presenting media from a streaming source. In some examples, panel meters 160A and 160B create media exposure events using the panel data, the type of media presentation device, the location 140, the date, etc. In some examples, when the asserted streaming media flag is detected, the media exposure events are sent to the media monitoring facility 165, as describe more fully below with respect to FIG. 4, across network 135. In other examples, when the panel meters detect the asserted streaming media flag, the panel meters 160A and 160B do not send the media exposure events to the media monitoring facility 165. An example implementation of the panel meter 160A is illustrated in FIG. 3B, which is described in greater detail below.

FIG. 2 is a block diagram of an example transcoder 120 of system 100 in FIG. 1. The example transcoder 120 of FIG. 2 includes an example transport stream decoder 205 to decode transport stream(s) carrying streaming media content to obtain the media content being streamed to the media presentation devices 150A and 150B. For example, the transport stream decoder 205 can decode an MPEG 2 transport 2 encapsulating MPEG 4 compressed media content to obtain the encapsulated MPEG 4 content, and then perform MPEG 4 decompression to obtain the uncompressed audio/video content.

The example transcoder 120 of FIG. 2 also includes an example metering data extractor 210 to extract metering data having a first format from the uncompressed media content obtained from the transport stream decoder 205. For example, the metering data extractor 210 can implement functionality provided by an SDK to extract one or more audio watermarks, one or more video (e.g., image) watermarks, etc., embedded in the uncompressed audio/video content obtained from the transport stream decoder 205. (For example, the uncompressed audio/video content may correspond to uncompressed pulse code modulation (PCM) audio data or other types of audio data, uncompressed video/image data, etc.) To transcode the metering data in the first format obtained from the metering data extractor 210 to a second format decodable by the streaming meter 155 and/or the on device meter 158, the example transcoder 120 of FIG. 2 further includes an example metering data transcoder 215. For example, the metering data transcoder 215 can determine (e.g., decode) the metering information (e.g., the watermark payload data, such as content identifying information, source identifying information, etc.) carried by a watermark extracted by the metering data extractor 210 and convert this metering information (also referred to as watermark payload data) into a text or binary format for inclusion in an M3U8 file or other data (e.g., text, binary, etc.) file for transmission as metadata (e.g., such as with a playlist or electronic program guide) accompanying the streaming media content. Additionally, or alternatively, the metering data transcoder 215 can convert the extracted metering information (i.e., watermark payload data) into a binary or other appropriate format for inclusion in one or more data fields capable of carrying metadata in the transport stream(s) providing the streaming media content to the media presentation devices 150A and 150B. For example, the metering data transcoder 215 can convert watermark payload data corresponding to the metering information to ID3 tag metadata for insertion in the transport stream(s) that is (are) to stream the media content in accordance with the HLS or other appropriate streaming protocol. Other additional or alternative examples of transcoding that can be employed by the metering data transcoder 215 to transcode metering data into a format decodable by the streaming meter 155 and/or the on device meter 158 are described in, for example, U.S. Pat. No. 7,827,312 ("METHODS AND APPARATUS FOR TRANSCODING METADATA" to Ramaswamy et al.), which issued on Nov. 2, 2010, and U.S. Provisional Application Ser. No. 61/442,758 ("METHODS AND APPARATUS TO MONITOR MEDIA CONTENT AT A CONTENT DISPLAY SITE" to Deliyannis et al.), which was filed on Feb. 14, 2011, U.S. Pat. No. 9,210,208 ("EXTRACTING PRE-AUDITED METADATA FROM STREAMING MEDIA CONSUMED ON SOFTWARE ON A TABLET PLATFORM"), which issued on Dec. 30, 2011. U.S. Pat. Nos. 7,827,312, 9,210,208 and U.S. Provisional Application Ser. No. 61/442,758 are hereby incorporated by reference in their respective entireties.

In the illustrated example of FIG. 2, the transcoder 120 includes a flag inserter 220. The flag inserter 220 asserts a streaming media flag in the payload of a watermark included in the metering data that is in the first format. The asserted streaming media flag indicates that the media is being distributed as streaming media. In some examples, the streaming media flag is located in an unused final distribution code slot of a media exposure watermark already included in the metering data that is in the first format. In other examples, the streaming media flag is located in a second watermark in a second, different, watermarking layer than the media exposure watermark already included in the metering data. For example, the media exposure watermark already included in the metering data may be in a first watermarking layer using a first set of frequency bands and the second watermark with the streaming media flag may be in a second watermarking layer using a second set of frequency bands.

The streaming media flag can be asserted using any method, for example, setting a bit in the content of a watermark to a one or a zero. Once the streaming media flag has been asserted, the flag inserter 220 embeds/encodes the watermark back into the audio data of the media, such that a panel meter can detect the asserted streaming media flag in the audio data of the media.

In some examples, the flag inserter 220 may also assert a streaming media flag in the text data, binary data, etc., that corresponds to metering data in the second format, such that the streaming meter 155 and/or the on device meter 158 can also identify the streaming media flag.

Additionally, in some examples, the transcoder 120 of FIG. 2 includes an example metering data encryptor 225 that employs any appropriate encryption to encrypt the metering data determined by the metering data transcoder 215. For example, the metering data encryptor 225 can encrypt the metering data using public or private key encryption such that the decryption key(s) are known and protected by the media monitoring facility 165. Inclusion of the metering data encryptor 225 can prevent unauthorized eavesdroppers from accessing the transcoded metering data identifying or otherwise associated with the streaming media content, thereby securing the privacy of users consuming the streaming media content.

In the illustrated example of FIG. 2, the transcoder 120 includes an example transport stream encoder 230 to re-encode the transport stream(s) carrying the streaming media content to include the metering data determined by the metering data transcoder 215 (and encrypted by the metering data encryptor 225, as appropriate). For example, the transport stream encoder 230 can encode the metering data into an external metadata channel, such as by encoding an M3U8 or other data file to contain the metering data and to be associated with (e.g., included in, appended to, sent prior to, etc.) the transport stream(s) that are to provide the streaming media content to the media presentation devices 150A and 150B. Additionally, or alternatively, the transport stream encoder 230 can encode the metering data into an internal metadata channel, such as by encoding metering data that is in a binary or other appropriate data format into one or more data fields of the transport stream(s) that is(are) capable of carrying metadata. For example, the transport stream encoder 230 can insert ID3 tag metadata corresponding to the metering data into the transport stream(s) that is (are) to stream the media content in accordance with the HLS or other appropriate streaming protocol.

FIG. 3A is a block diagram of an example streaming meter 155 from system 100 of FIG. 1. In the illustrated example of FIG. 3A, streaming meter 155 includes a network traffic monitor 305A and a network traffic reporter 310A. In the illustrated example, the streaming meter 155 generates records of network communications transmitted between the two media presentation devices 150A and 150B and gateway 145. In some examples, the streaming meter 155 differentiates between the two media presentation devices 150A and 150B by snooping the media access control address (MAC address) of the respective presentation device. Additionally, or alternatively, any other parameters related to the network traffic records may be determined (e.g., MAC address of the destination network traffic, Internet Protocol address (IP address) of the source and/or destination of network traffic, port name of the source and/or destination of network traffic, application related data indicated in the network traffic, etc.). In some examples, the determined parameters can be used to determine the origin device of each records.

In the illustrated example, the communications between the two media presentation devices 150A and 150B and gateway 145 are wireless communications snooped by a monitoring radio included in the network traffic monitor 305A. In other examples, the communications transmitted between the two media presentation devices 150A and 150B and gateway 145 may be across a local area network (LAN) that the streaming meter 155 is coupled with. The streaming meter 155 processes the monitored traffic to create records of the network traffic. In some examples, the network traffic reports include media exposure events.

The network traffic monitor 305 passes the network traffic reports to the network traffic reporter 310A. The network traffic reporter 310A sends the network traffic reports to the media monitoring facility 165, as describe more fully below with respect to FIG. 4. For example, the network traffic reporter 310A may generate a GET or POST request including the metering data as a parameter of the request. Alternatively, any other method of transmitting the network traffic reports to the media monitoring facility 165 may be used. The network traffic reports may be transmitted at any interval. For example, the network traffic reports may be transmitted as it is collected (e.g., streamed), may be transmitted when a certain amount of network traffic reports is collected, when an available memory space is filled or reaches a threshold capacity (e.g., 90% or some other percentage being full), when a particular event is detected (e.g., when presentation of the media content ends, when new media content is presented, etc.), whenever new network traffic reports are obtained, etc. The network traffic reporter 310A may transmit a network traffic report once for each time media is presented or may transmit network traffic reports multiple times (e.g., every time an event occurs, every time identifying information changes (e.g., when the media content includes metering data that change throughout the media content, etc.).

FIG. 3B is a block diagram of an example panel meter 160A from system 100 of FIG. 1. Panel meter 160A includes a panel data extractor 305B and a panel data reporter 310B. In the illustrated example of FIG. 3B, the panel data extractor 305B extracts the content of the payloads from watermarks embedded/encoded in the audio output from the audio output channel of media presentation device 150A. The panel data extractor 305B creates media exposure events using the extracted content from the payloads from watermarks, for example metering data (e.g., media-identifying metadata, codes, signatures, watermarks, and/or other information that may be used to identify presented media), and/or application usage information (e.g., an identifier of an application, a time and/or duration of use of the application, a rating of the application, etc.), and/or user-identifying information (e.g., demographic information, a user identifier, a panelist identifier, a username, etc.), and/or presentation information (e.g., the time/date the content was presented, the location the content was presented, the device type the content was presented on, etc.). The panel data extractor 305B includes the media exposure events in the panel data.

The panel data extractor 305B passes the panel data to the panel data reporter 310B. The panel data reporter 310B sends the panel data to the media monitoring facility 165. For example, the panel data reporter 310B may generate a GET or POST request including the panel data as a parameter of the request. Alternatively, any other method of transmitting the panel data to the media monitoring facility 165 may be used. The panel data may be transmitted at any interval. For example, the panel data may be transmitted as it is collected (e.g., streamed), may be transmitted when a certain amount of panel data is collected, when an available memory space is filled or reaches a threshold capacity (e.g., 90% or some other percentage being full), when a particular event is detected (e.g., when presentation of the media content ends, when new media content is presented, etc.), whenever new panel data are obtained, etc. The panel data reporter 310B may transmit panel data once for each media content or may transmit panel data multiple times (e.g., every time an event occurs, every time identifying information changes (e.g., when the media content includes metering data that change throughout the media content, etc.).

FIG. 3C is a block diagram of an example on device meter 158 from system 100 of FIG. 1. In the illustrated example of FIG. 3A, on device meter 158 includes a network traffic monitor 305C and a network traffic reporter 310C. In the illustrated example, the on device meter 158 generates records of network communications transmitted between the media presentation device 150A and gateway 145.

In the illustrated example, the communications between the media presentation device 150A and gateway 145 is wireless communications. In other examples, the communications transmitted between the media presentation device 150A and gateway 145 may be across a local area network (LAN). The on device meter 158 processes the monitored traffic to create records of the network traffic. In some examples, the network traffic reports include media exposure events.

The network traffic monitor 305C passes the network traffic reports to the network traffic reporter 310C. The network traffic reporter 310C sends the network traffic reports to the media monitoring facility 165, as describe more fully below with respect to FIG. 4. For example, the network traffic reporter 310C may generate a GET or POST request including the metering data as a parameter of the request. Alternatively, any other method of transmitting the network traffic reports to the media monitoring facility 165 may be used. The network traffic reports may be transmitted at any interval. For example, the network traffic reports may be transmitted as it is collected (e.g., streamed), may be transmitted when a certain amount of network traffic reports is collected, when an available memory space is filled or reaches a threshold capacity (e.g., 90% or some other percentage being full), when a particular event is detected (e.g., when presentation of the media content ends, when new media content is presented, etc.), whenever new network traffic reports are obtained, etc. The network traffic reporter 310C may transmit a network traffic report once for each time media is presented or may transmit network traffic reports multiple times (e.g., every time an event occurs, every time identifying information changes (e.g., when the media content includes metering data that change throughout the media content, etc.).

FIG. 4 is a block diagram of an example media monitoring facility 165 of system 100 from FIG. 1. In the illustrated example of FIG. 4, the media monitoring facility 165 includes an example data collector 405, an example flag detector 410, an example data selector 415 and an example report generator 420. The example data collector 405 receives the network traffic reports from the network traffic reporter 310A of the streaming meter 155 of FIG. 3A. The example data collector 405 passes the network traffic reports to the example flag detector 410. Although only one monitored location is shown in FIG. 1 (e.g., location 140), the example data collector 405 may receive network traffic reports from multiple network traffic reporters in different locations.

The example data collector 405 also receives the panel data from the example panel data reporter 310B of the example panel meter 160A of FIG. 3B. The example data collector 405 may also receive panel data from panel meter 160B. The example data collector 405 passes the panel data to the example flag detector 410. Although only one monitored location is shown in FIG. 1 (e.g. location 140), the example data collector 405 may receive panel data from multiple panel data reporters in different locations.

The example data collector 405 also receives the network traffic reports from the example on device meter 158 of FIG. 1. The example data collector 405 passes the network traffic reports to the example flag detector 410. Although only one monitored location is shown in FIG. 1 (e.g., location 140), the example data collector 405 may receive network traffic reports from multiple on device meters in different locations.

The example flag detector 410 receives the network traffic reports and the panel data from the example data collector 405. As explained above, the example flag detector 410 may receive network traffic reports and panel data from multiple locations. The example flag detector 410 sorts the receive network traffic reports and the panel data by location. In some examples, the location of the network traffic reports can be determined using the identity of the streaming meter 155 and/or the identity of the on device meter 158, and the location of the panel data can be determined by the location of the panel meter reported in the panel data. Any other means for determining the locations of the streaming meter and the panel meter may be used.

In some examples, the flag detector 410 determines that a streaming meter and/or an on device meter is located at the same location as a panel meter. When a panel meter is at the same location as a streaming meter and/or an on device meter, the example flag detector 410 may receive a media exposure event from the streaming meter and/or an on device meter, and a panel meter. A streaming meter and an on device meter only monitors media that is streamed to media presentation devices. A panel meter can monitor media that is streamed to a media presentation device and media that is broadcast to the media presentation device. As such, streaming media events that are monitored by the panel meter may also be monitored by a streaming meter and/or an on device meter at the same location. For example, flag detector 410 may receive a media exposure event included in the network traffic reports from the example streaming meter 155 and/or the on device meter 158 when monitoring the media presentation device 150A when it is presenting streaming media. The flag detector 410 may also receive a media exposure event included in the panel data from the example panel meter 160A when monitoring the media presentation device 150A when it is presenting streaming media.

In some examples, the flag detector 410 determines if the panel data for a media exposure event includes an asserted streaming media flag. The asserted streaming media flag indicates that the media corresponding to the media exposure event was streamed to the media presentation device. In some examples, the streaming media flag may be located in an unused final distribution code slot of a media exposure watermark included in the panel data. In other examples, the streaming media flag may be located in a second watermark in a second, different, watermarking layer than the media exposure watermark. The example flag detector 410 sends an indication that an asserted streaming media flag associated with a media exposure event was detected, to the data selector 415.

In the illustrated example of FIG. 4, the example data selector 415 discards/does not use the media exposure events from the panel data when the streaming media flag is asserted in the panel data for the media exposure event and a streaming meter and/or an on device meter is at the same location as the panel meter. In some examples, the example data selector 415 sends the census data from the panel meter for the media exposure event to the report generator 420 even though the media exposure event was discarded/not used. The census data may be used to verify census reports.

The data selector 415 passes the media exposure events from the network traffic report to the report generator. The example data selector 415 does not discard media exposure events from the panel data when a streaming media flag is not asserted in the panel data for the media exposure event. Instead, the example data selector 415 passes the media exposure events from the panel data to the report generator.

In the illustrated example of FIG. 4, the example report generator 420 receives the media exposure events, as well as any census data, from the data selector 415. The report generator creates reports of media presented at the different monitored locations. The reports may be created daily, weekly, monthly, or at the occurrence of an event, for example a request for a report.

While an example manner of implementing the media monitoring facility of FIG. 1 is illustrated in FIG. 4, one or more of the elements, processes and/or devices illustrated in FIG. 4 may be combined, divided, re-arranged, omitted, eliminated and/or implemented in any other way. Further, the example data collector 405, the example flag detector 410, the example data selector 415, the example report generator 420 and/or, more generally, the example media monitoring facility 165 of FIG. 4 may be implemented by hardware, software, firmware and/or any combination of hardware, software and/or firmware. Thus, for example, any of the example data collector 405, the example flag detector 410, the example data selector 415, and the example report generator 420 and/or, more generally, the example media monitoring facility 165 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, data collector 405, the example flag detector 410, the example data selector 415, and the example report generator 420 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitoring facility 165 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the media monitoring facility 165 of FIG. 1 is shown in FIG. 4. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example media monitoring facility 165 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5, 6, 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
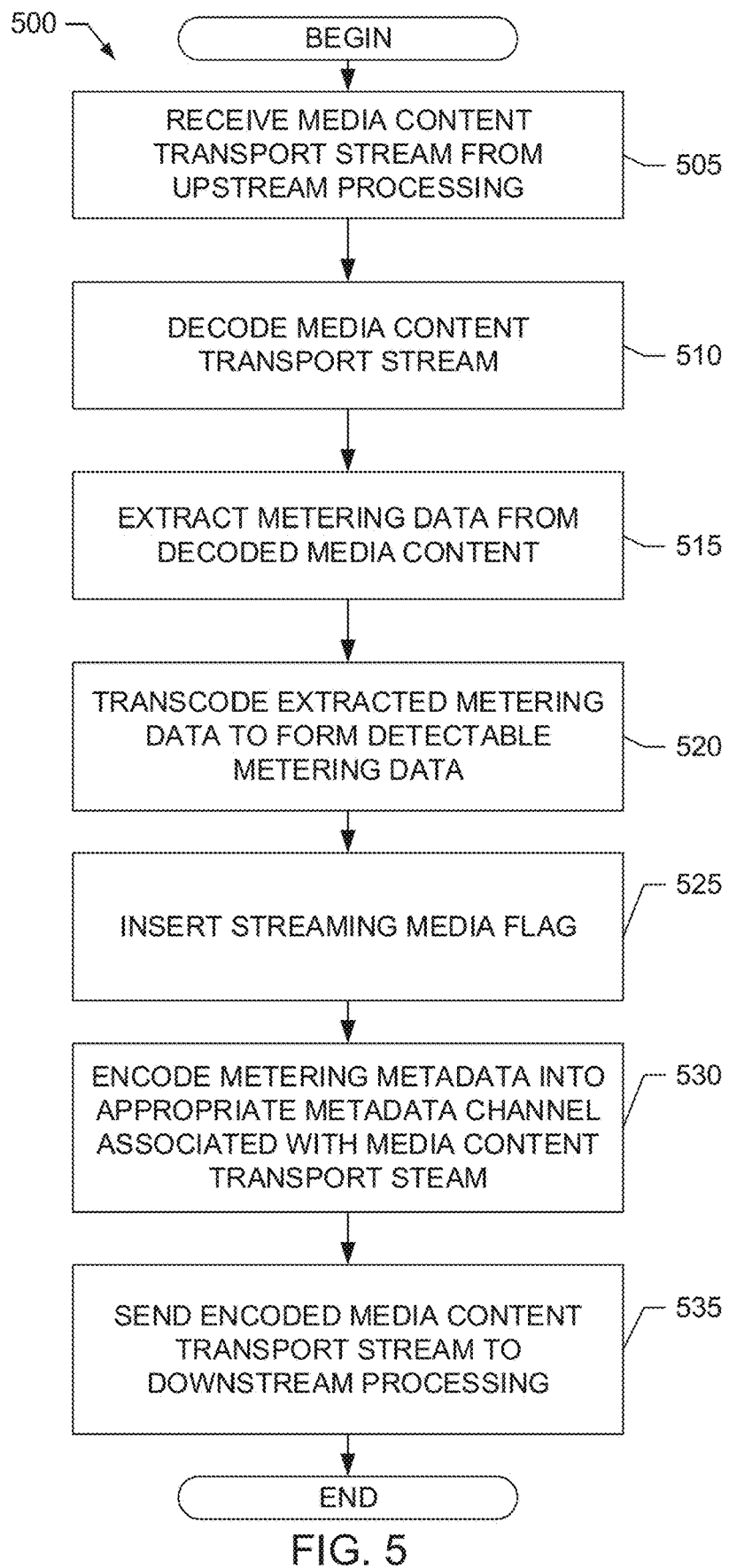
FIG. 5 is a flowchart representative of machine readable instructions that may be executed to implement the example transcoder of FIGS. 1 and/or 2.

FIG. 5 is a flowchart representative of machine readable instructions which may be executed to implement the example transcoder 120 of FIG. 2. With reference to the preceding figures, the example machine readable instructions 500 of FIG. 5 begin at block 505 at which the transcoder 120 receives a transport stream carrying media content to be streamed to the media presentation devices 150A and 150B. At block 510, the transport stream decoder 205 of the transcoder 120 decodes the transport stream to obtain the (e.g., uncompressed) media content being streamed to the media presentation devices 150A and 150B. At block 515, the metering data extractor 210 of the transcoder 120 extracts metering data having a first format (e.g., such as one or more embedded audio/video watermarks) from the decoded (e.g., uncompressed) media content obtained at block 510. At block 520, the metering data transcoder 215 of the transcoder 120 transcodes the metering data in the first format obtained at block 515 to form metering data having a second format (e.g., a text, binary or other data format) that is decodable by the streaming meter 155 and/or the on device meter 158. At block 525, the flag inserter 220 of the transcoder 120 inserts an asserted streaming media flag into the metering data that is in the first format. The streaming media flag indicates that the media is being distributed as streaming media. In some examples, the flag inserter 220 asserts the streaming media flag in an unused final distribution code slot of a media exposure watermark already included in the metering data that is in the first format. In other examples, the flag inserter 220 asserts the streaming media flag in a second watermark in a second, different, watermarking layer than the media exposure watermark already included in the metering data in a first watermarking layer. For example, the media exposure watermark already included in the metering data may be in a first watermarking layer using a first set of frequency bands and the second watermark with the streaming media flag may be in a second watermarking layer using a second set of frequency bands. The flag inserter 220 embeds the watermark with the asserted streaming media flag back into the audio data of the media content.

In some examples, the flag inserter 220 may insert a streaming media flag into text data, binary data, etc., that corresponds to metering data in the second format, such that the streaming meter 155 and/or the on device meter 158 can identify the streaming media flag. At block 530, the transport stream encoder 230 of the transcoder 120 re-encodes the transport stream that is to carry the streaming media content to include the metering data in a metadata channel to be associated with the transport stream. At block 535, the transcoder 120 sends the re-encoded transport stream (and the metadata channel carrying the transcoded metering data) to any other downstream processing elements for streaming to the media presentation devices 150A and 150B. Execution of the example machine readable instructions 500 then ends.

Figure 6:
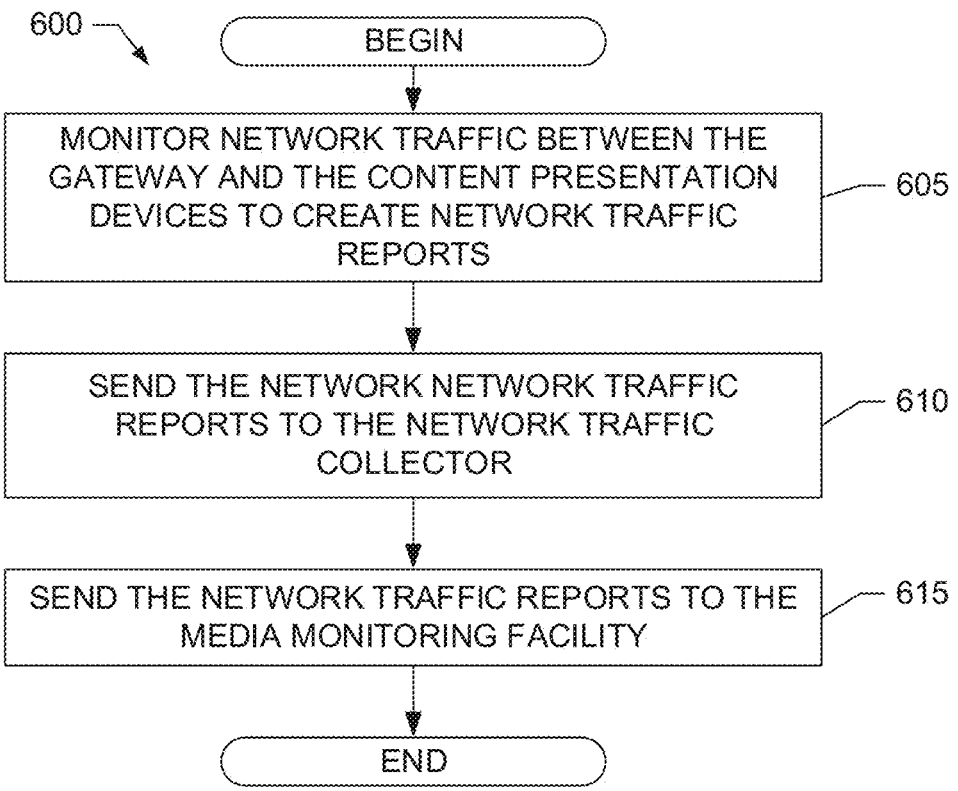
FIG. 6 is a flowchart representative of machine readable instructions that may be executed to implement the example streaming meter of FIGS. 1 and/or 3A.

FIG. 6 is a flowchart representative of machine readable instructions which may be executed to implement the example streaming meter 155 of FIG. 3A. The example machine readable instructions 600 of FIG. 6 begin execution at block 605 where the network traffic monitor 305A of streaming meter 155 monitors the network traffic between gateway 145 and the media presentation devices 150A and 150B. In some examples, the network coupling the media presentation devices 150A and 150B to gateway 145 is a wireless network (e.g., WiFi networks, etc.). In other examples, the network traffic monitor 305A may monitor a local area network (LAN) that couples the gateway 145 to the media presentation devices 150A and 150B.

Flow continues at block 610 where records of the network traffic that include the media data are sent to the network traffic reporter 310A of streaming meter 155. Flow continues at block 615 where the network traffic reporter 310A sends the network traffic reports to the media monitoring facility 165. The network traffic reports may be sent to the media monitoring facility 165 periodically (e.g. hourly, daily, weekly, etc.), or at the occurrence of an event, for example a request for network traffic reports, the start or end of a media exposure event, or the like. Execution of the example machine readable instructions 600 then ends.

FIG. 6 is a flowchart representative of machine readable instructions which may also be executed to implement the example on device meter 158 of FIG. 3A. The example machine readable instructions 600 of FIG. 6 begin execution at block 605 where the network traffic monitor 305C of on device meter 158 monitors the network traffic between gateway 145 and the media presentation device 150A. In some examples, the network coupling the media presentation device 150A to gateway 145 is a wireless network (e.g., WiFi networks, etc.). In other examples, the network traffic monitor 305C may monitor a local area network (LAN) that couples the gateway 145 to the media presentation device 150A.

Flow continues at block 610 where records of the network traffic that include the media data are sent to the network traffic reporter 310C of on device meter 158. Flow continues at block 615 where the network traffic reporter 310C sends the network traffic reports to the media monitoring facility 165. The network traffic reports may be sent to the media monitoring facility 165 periodically (e.g. hourly, daily, weekly, etc.), or at the occurrence of an event, for example a request for network traffic reports, the start or end of a media exposure event, or the like. Execution of the example machine readable instructions 600 then ends.

Figure 7:
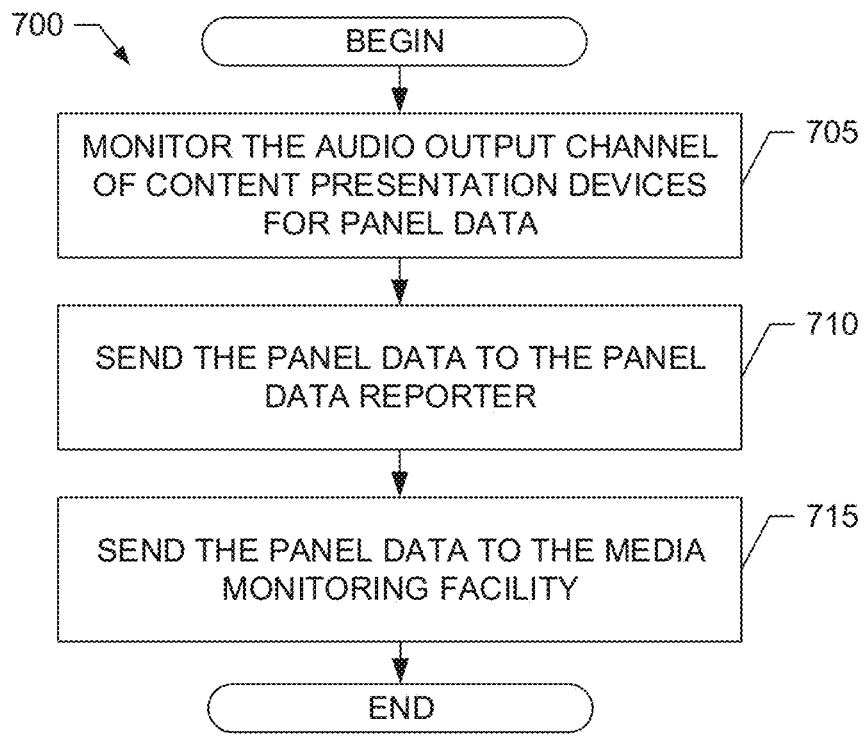
FIG. 7 is a flowchart representative of machine readable instructions that may be executed to implement the example panel meter of FIGS. 1 and/or 3B.

FIG. 7 is a flowchart representative of machine readable instructions which may be executed to implement the example panel meter 160A of FIG. 3B. The example machine readable instructions 700 of FIG. 7 begin execution at block 705 where the panel data extractor 305B of panel meter 160A monitors the audio output channel of media presentation device 150A to capture panel data. The panel meter may monitor the audio output channel of media presentation device 150A using a direct connection, or indirectly using a microphone. The panel data extractor 305B detects watermarks embedded in the audio output and extracts the watermark's payloads to include in the panel data.

Flow continues at block 710 where panel data is sent to the panel data reporter 310B of panel meter 160A. Flow continues at block 715 where the panel data reporter 310B sends the panel data to the media monitoring facility 165. The panel data may be sent to the media monitoring facility 165 periodically (e.g. hourly, daily, weekly, etc.), or at the occurrence of an event, for example a request for panel data, the start or end of a media exposure event, or the like. Execution of the example machine readable instructions 700 then ends.

Figure 8:
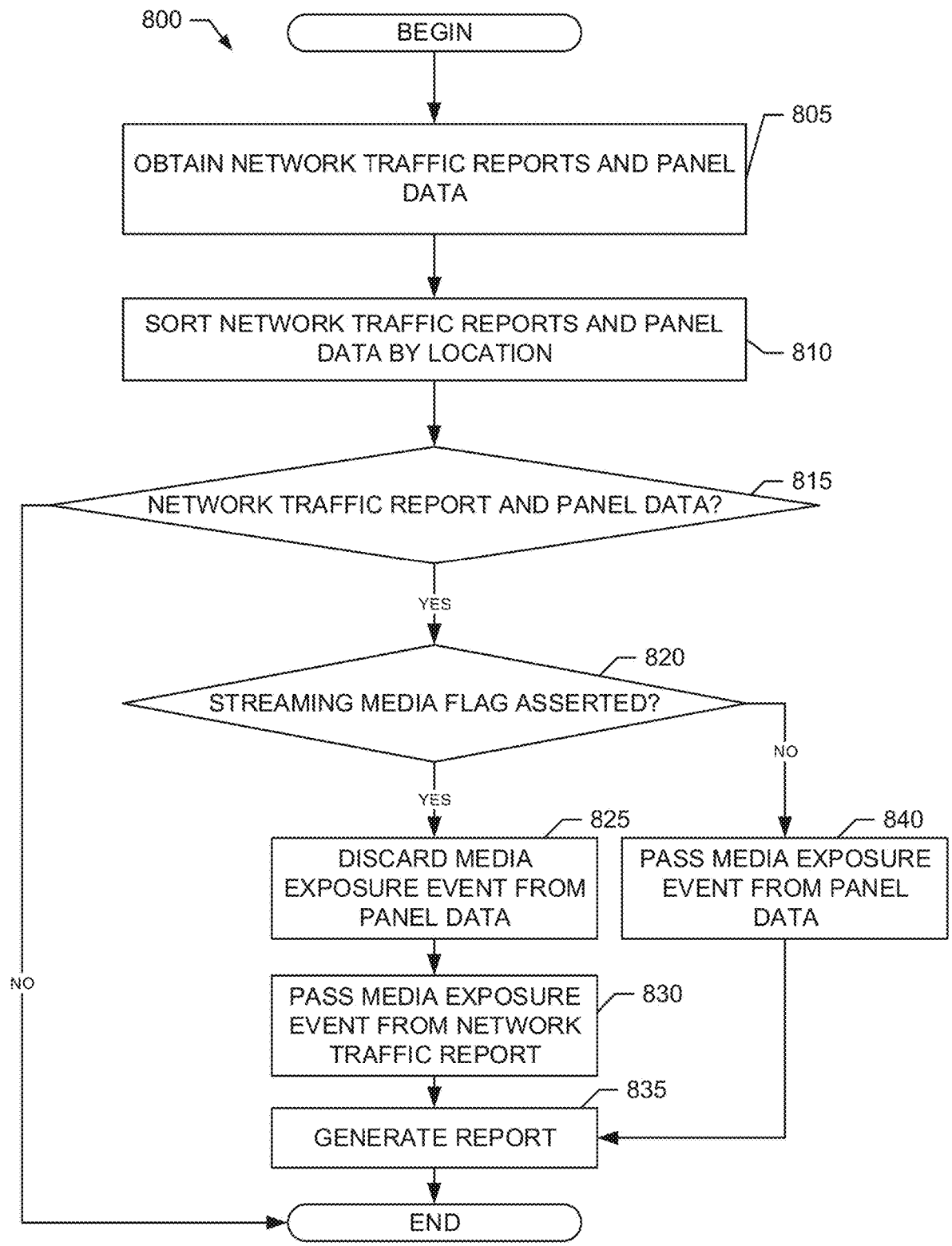
FIG. 8 is a flowchart representative of machine readable instructions that may be executed to implement the example media monitoring facility of FIGS. 1 and/or 4.

FIG. 8 is a flowchart representative of machine readable instructions which may be executed to implement the example media monitoring facility 165 of FIG. 4. The example machine readable instructions 800 of FIG. 8 begin execution at block 805 where the data collector 405 of the media monitoring facility 165 obtains the network traffic reports from the streaming meter 155 and/or the on device meter 158, and the panel data from the panel meter 160A. The data collector 405 passes the network traffic reports and the panel data to the flag detector 410 of the media monitoring facility 165.

Flow continues at block 810 where the flag detector 410 of the media monitoring facility 165 sorts the network traffic reports and the panel data by location. When a location includes a network traffic report and panel data, it indicates that the location includes both a streaming meter, for example streaming meter 155 and/or the on device meter 158, and a panel meter, for example panel meters 160A and/or 160B. When a location includes both a streaming meter and a panel meter, flow continues at 820. Otherwise, when a location only has network traffic reports or panel data, but not both network traffic reports and panel data, it indicates a location that only has one type of meter, for example, a panel meter or a streaming meter. When a location only has one type of meter, the execution of the example machine readable instructions 800 ends.

At block 820 the flag detector 410 determines if the panel data, from the location, includes an asserted streaming media flag. In some examples, the streaming media flag may be located in an unused final distribution code slot of a media exposure watermark included in the panel data. In other examples, the media exposure watermark may be located in a first watermarking layer and the streaming media flag may be located in a second watermark in a second, different, watermarking layer.

When the flag detector 410 detects an asserted streaming media flag, flow continues at block 825 where the data selector 415 discards the media exposure event from the panel data associated with the asserted streaming media flag. Because the panel data is from a location that has both types of meters, and the panel data has a streaming media flag, the data selector 415 will have received duplicate media exposure events (e.g., a media exposure event from streaming meter 155 and/or the on device meter 158, and a media exposure event from panel meter 160A). In some examples, the data selector 415 discards the duplicate media exposure event from the panel data and retains the media exposure event from the network traffic report. In other examples, the data selector 415 may discard the duplicate media exposure event from the network traffic report and retain the media exposure event from the panel meter.

Flow continues at block 830 where the data selector 415 passes the media exposure event from the network traffic report from the location, to the report generator 420 of the media monitoring facility 165. In some examples, the census data from the media exposure event in the panel data is also passed to the report generator 420, even though the media exposure event from the panel data is discarded. The report generator 420 may use the census data from the panel meter. For example, the report generator 420 may use the census data to verify census reports.

Flow continues at block 835 where the report generator 420 generates media presentation reports. The report generator 420 may generate reports of media presented at the different monitored locations. Because the duplicate media exposure event from the panel meter 160A was discarded, the reports will be more accurate than if the duplicate media exposure event had been retained/counted. The reports may be created daily, weekly, monthly, or at the occurrence of an event, for example a request for a report. The execution of the example machine readable instructions 800 ends.

At block 820, when the flag detector 410 does not detect an asserted streaming media flag, flow continues at block 840. Panel data that does not contain a streaming media flag, or an asserted streaming media flag, indicates that the media was not streamed to the media presentation device, but instead was live (e.g., broadcast) media content, stored media content (e.g., on-demand content), etc. As such, neither the streaming meter 155 or the on device meter 158 would detect the media exposure event. Therefore, the media exposure event in the panel data would not be a duplicate media exposure event. Therefore, at block 840, the data selector 415 passes the media exposure event from the panel data to the report generator 420. Flow continues in block 835 as described above.

Figure 9:
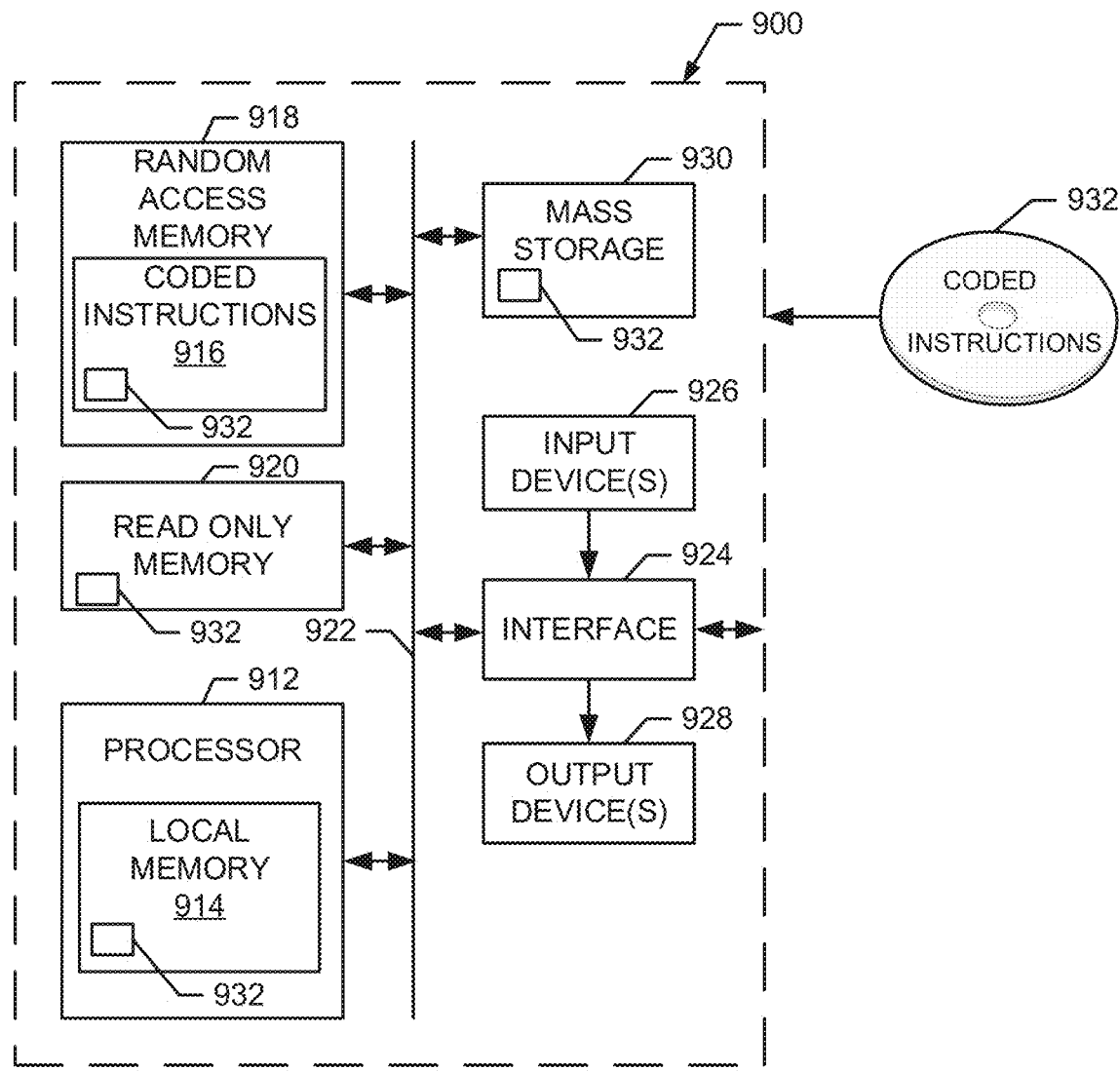
FIG. 9 is a block diagram of an example processing platform structured to execute the instructions of FIG. 8 to implement the example media monitoring facility of FIGS. 1 and/or 4.

FIG. 9 is a block diagram of an example processor platform 900 structured to execute the instructions of FIGS. 5, 6, 7 and 8 to implement the media monitoring facility 165 of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data collector 405, the example flag detector 410, the example data selector 415, and the example report generator 420.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 5, 6, 7 and 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that discard duplicate media exposure events from locations that include both a streaming meter and a panel meter. The disclosed methods, apparatus and articles of manufacture improve the accuracy of using a computing device by removing duplicate media exposure events from media presentation reports. By removing duplicate media exposure events, the accuracy of the media presentation reports is increased. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to monitor media presented by a media presentation device, the apparatus comprising:
at least one memory;
instruction in the apparatus; and
processor circuitry to execute the instructions to at least:
determine whether a streaming media flag is asserted in a payload of a watermark associated with a first media exposure event included in first data from a first meter, the streaming media flag to indicate whether the media was distributed to the media presentation device as streaming media, the first meter to monitor the media presentation device via a media output of the media presentation device;
determine whether the first meter is associated with a same location as a second meter, the second meter associated with second data including a second media exposure event; and
in response to a determination that (i) the streaming media flag is asserted and (ii) the first meter is associated with the same location as the second meter:
discard the first media exposure event included in the first data; and
use the second media exposure event included in the second data to credit the media presented by the media presentation device.

2. The apparatus of claim 1, wherein the watermark is a first watermark encoded in a first watermarking layer of the media, and a second watermark is encoded in a second watermarking layer of the media, the second watermark to include information to identify the media.

3. The apparatus of claim 1, wherein the payload of the watermark also includes information to identify the media.

4. The apparatus of claim 1, wherein the second meter is to monitor network traffic associated with the location.

5. The apparatus of claim 4, wherein the second data is based on a portion of the network traffic associated with the media presentation device.

6. The apparatus of claim 5, wherein the streaming media flag is a first streaming media flag, and the second data includes a second streaming media flag obtained from the portion of the network traffic associated with the media presentation device.

7. The apparatus of claim 1, wherein the second data includes identification information to identify the second meter, and the processor circuitry is to determine whether the first meter is associated with the same location as the second meter based on the identification information from the second data.

8. The apparatus of claim 1, wherein the processor circuitry is to use demographic information included in the first data to credit the media presented by the media presentation device.

9. A method to monitor media presented by a media presentation device, the method comprising:
determining, by executing an instruction with at least one processor, whether a streaming media flag is asserted in a payload of a watermark associated with a first media exposure event included in first data from a first meter, the streaming media flag to indicate whether the media was distributed to the media presentation device as streaming media, the first meter to monitor the media presentation device via a media output of the media presentation device;

determining, by executing an instruction with the at least one processor, whether the first meter is associated with a same location as a second meter, the second meter associated with second data including a second media exposure event; and in response to determining that (i) the streaming media flag is asserted and (ii) the first meter is associated with the same location as the second meter:
    discard the first media exposure event included in the first data; and
    use the second media exposure event included in the second data to credit the media presented by the media presentation device.

10. The method of claim 9, wherein the watermark is a first watermark encoded in a first watermarking layer of the media, and a second watermark is encoded in a second watermarking layer of the media, the second watermark to include information to identify the media.

11. The method of claim 9, wherein the payload of the watermark also includes information to identify the media.

12. The method of claim 9, wherein the second meter is to monitor network traffic associated with the location.

13. The method of claim 12, wherein the second data is based on a portion of the network traffic associated with the media presentation device.

14. The method of claim 13, wherein the streaming media flag is a first streaming media flag, and the second data includes a second streaming media flag obtained from the portion of the network traffic associated with the media presentation device.

15. The method of claim 9, wherein the second data includes identification information to identify the second meter, and the determining of whether the first meter is associated with the same location as the second meter is based on the identification information from the second data.

16. The method of claim 9, further including using demographic information included in the first data to credit the media presented by the media presentation device.

17. An apparatus to monitor media presented by a media presentation device, the apparatus comprising:
    at least one memory;
    instruction in the apparatus; and
    processor circuitry to execute the instructions to at least:
        detect a watermark in the media presented by the media presentation device;
        determine whether a streaming media flag is asserted in a payload of the watermark, the streaming media flag to indicate whether the media was distributed to the media presentation device as streaming media;
        in response to a determination that the streaming media flag is asserted, discard the detected watermark from collected data to be reported to a remote server; and
        report the collected data to the remote server via a network.

18. The apparatus of claim 17, wherein the watermark is a first watermark encoded in a first watermarking layer of the media, and a second watermark is encoded in a second watermarking layer of the media, the second watermark to include information to identify the media.

19. The apparatus of claim 17, wherein the payload of the watermark also includes information to identify the media.

20. The apparatus of claim 17, wherein the processor circuitry is to include demographic information associated with presentation of the media by the media presentation device in the collected data to be reported to the remote server.

* * * * *